March 6, 1934.   G. PELLEGRINO ET AL   1,950,263
DRYING APPARATUS FOR MALT AND SIMILAR GRAIN
Filed Aug. 17, 1932   2 Sheets-Sheet 1
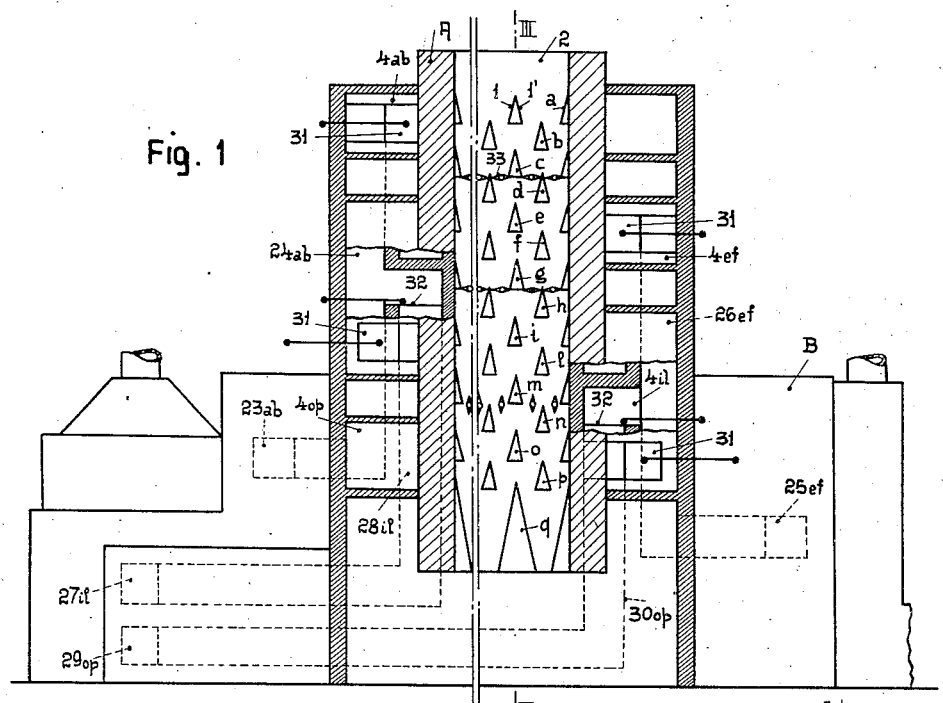
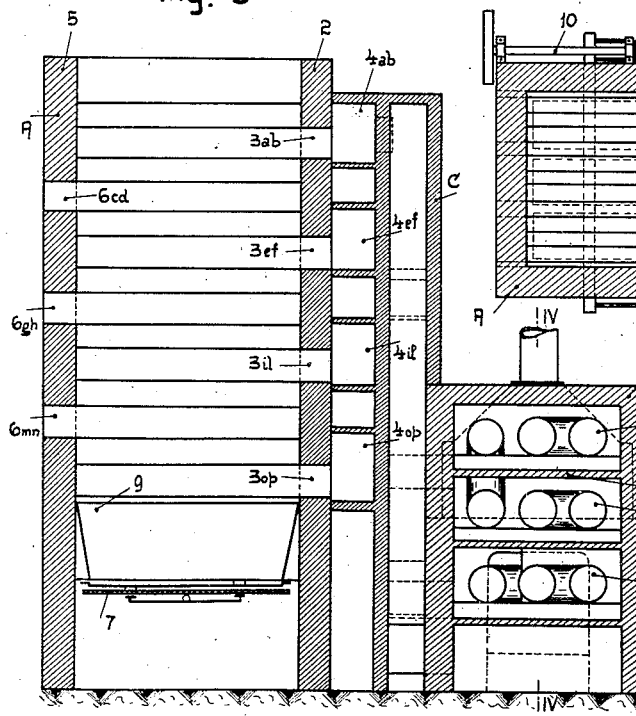
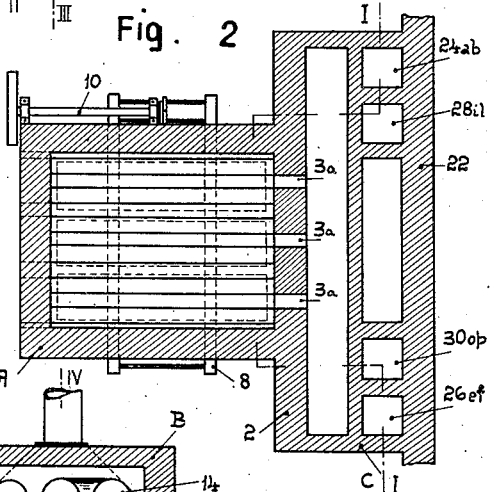

March 6, 1934.  G. PELLEGRINO ET AL  1,950,263
DRYING APPARATUS FOR MALT AND SIMILAR GRAIN
Filed Aug. 17, 1932   2 Sheets-Sheet 2

Inventors
Giuseppe Pellegrino
Mario Pellegrino
By
Sommers & Young
Attys.

Patented Mar. 6, 1934

1,950,263

UNITED STATES PATENT OFFICE 1,950,263

DRYING APPARATUS FOR MALT AND SIMILAR GRAIN

Giuseppe Pellegrino and Mario Pellegrino, Turin, Italy

Application August 17, 1932, Serial No. 629,198
In Great Britain May 6, 1932

7 Claims. (Cl. 34—34)

It is well known that the barley used in making beer must be treated after germination at gradually increasing temperatures, viz. first at 30° C., then at 60° C. and 80° C. and finally at 100° C. and upwards according to the quality of beer it is desired to produce.

The known drying machines or towers comprise generally two, three or four superposed shelves or floors for the purpose of effecting such a gradual drying operation. The high temperature existing at the bottom floor gradually decreases in passing through the various layers of barley placed on the upper floors. However such air temperatures, which would decrease from one floor to the next, are not graduated in the required manner, owing to the large surface of the floors and the uneven thickness of the layers of barley and the barley is therefore not treated in a regular and uniform manner, not even when a suction fan is used to promote the flow of the air currents.

The drying apparatus forming the object of this invention is so constructed as to allow of a continuous supply and automatic delivery of the malt to be treated, the superposed layers of malt contained in a vertical drying chamber being heated by means of separate currents of air at temperatures increasing from top to bottom.

This invention has further for its object to collect separately, and discharge directly into the outer air, the separate currents of air at different temperatures, which have been used to heat the corresponding layers of malt grains, thus preventing such currents of air mixing together in the drying apparatus. In this way a predetermined temperature corresponds to each malt layer, said temperature being kept constant by the corresponding current of air coming directly from the heater.

According to this invention the various currents of air are heated by causing a predetermined volume of air to pass through a channel enclosing a plurality of heating members and arranging intermediate tappings at different temperatures, so that said air is supplied through separate conduits to the chamber containing the grains to be treated.

Flap valves adapted for producing an even drying of the malt column supplied at the top when the operation is started, are arranged in the drying tower on horizontal planes situated somewhat below the conduits through which the currents of air at different temperatures are supplied.

Heating can be advantageously effected by means of a forced draught heater; the current of air from the ventilator flows along the conduits through which the combustion products pass, and along the oven walls; a small quantity of this air is utilized for feeding the combustion in the oven, and the remainder of the air flows to the drying tower.

Every tap branched from the collector of the oven is provided with a slide valve for adjusting the quantity of air supplied to the individual drying stages, so as to supply to each stage the necessary quantity of air for obtaining the desired result and connecting openings are provided between the intermediate taps and are controlled by slide valves for adjusting and exactly determining the temperatures in the drying stages.

The annexed drawings show diagrammatically and by way of example a constructional form of the drying apparatus forming the object of this invention.

Figure 1 is a sectional view of the drying apparatus on the broken line I—I of Fig. 2;

Figure 2 is a horizontal section;

Figure 3 is a vertical section on line III—III of Fig. 1;

Figure 4:
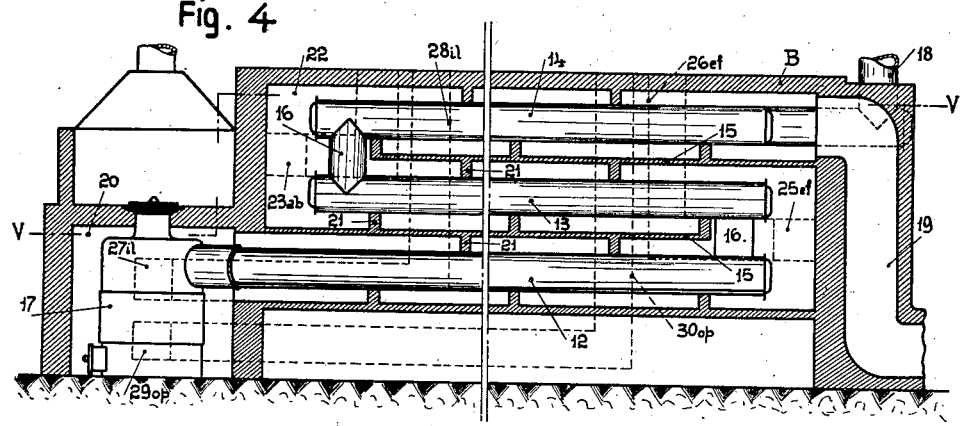
Figure 4 is a vertical section of the heater on line IV—IV of Fig. 3.
Figure 5:
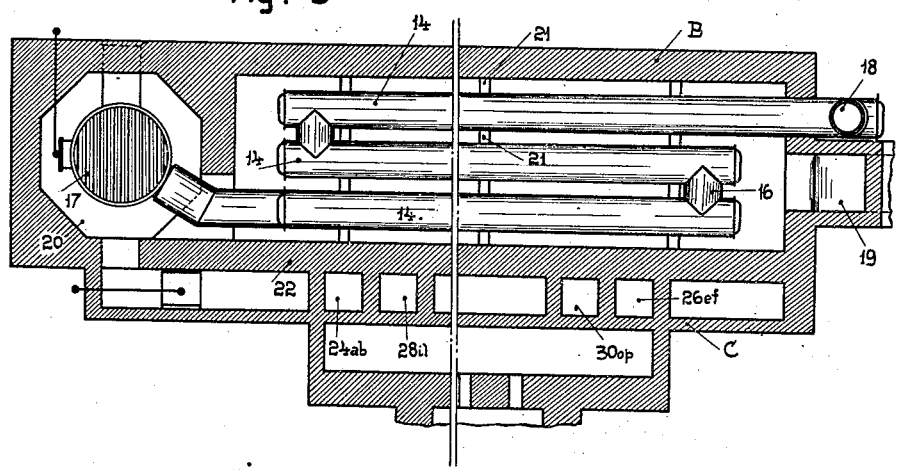
Figure 5 is a horizontal section of the heater on line V—V of Fig. 4.

Referring to the drawings, the drying apparatus is substantially constituted by a rectangular drying chamber A and an air heater B connected together by means of a brickwork housing C.

The drying tower A is open at its upper end thus allowing of a continuous supply of the malt to be treated at the top and is crossed by a plurality of rows of horizontal conduits, each composed by two plates 1 and 1', for instance of galvanized plate connected to each other in the form of an inverted V so that they are closed at the top and open at the bottom.

The construction shown on the drawings includes fourteen rows of horizontal roof-shaped conduits $a, b, c, d, \ldots p$, the conduits of every other row being arranged in staggered relation to the conduits of the rows $b, d, f, \ldots p$.

The wall 2 of the drying tower A is provided at the level of the two uppermost rows $a$ and $b$ with openings $3_{a-b}$ communicating with one horizontal collector $4_{a-b}$, to which a current of air heated at the lowest temperature, e. g. 30° C. is supplied.

Similar openings $3_{e-f}$, $3_{i-l}$, $3_{o-p}$ are provided at the level of the conduits of each of the pairs of rows $e$—$f$, $i$—$l$, $o$—$p$ and communicate with horizontal collectors $4_{e-f}$, $4_{i-l}$, $4_{o-p}$ respectively, arranged within the housing C and receiving currents of air at increasing temperatures.

The opposite wall 5 of the tower A (Fig. 3) is provided with opening $6_{c-d}$ at the level of the pair of conduit rows $c$ and $d$; the size of these openings being substantially the same as the size of the openings formed in the wall 2, as described above.

Each conduits of the pairs of rows $g$, $h$ and $m$, $n$ is provided with openings $6_{g-h}$ and $6_{m-n}$ which communicate, like the openings $6_{c-d}$, directly with the outer air.

The conduits of the last row 9 of larger size are not provided with end openings and the spaces between said conduits form the outlet mouths for the discharge of the dried malt.

Slats 7 somewhat larger than the said mouths are arranged under the latter on a rocking cradle 8, operated by a rocking lever 9, which in turn is operated by a rotating shaft 10 through a crank or cam mechanism. The oscillation of the cradle 8 can be adjusted with respect to the swinging movement of the rocking lever 9 by means of adjustable screw clamps 11 according to the play left at the operative end of said rocking lever.

When the cradle is stationary, the slats 7 stop the delivery of malt.

The air heater consists of a chamber enclosing three sets of zigzag shaped conduits 12, 13 and 14 separated by partitions 15 and connected in series by means of suitable connecting pieces 16.

The combustion products issuing from the furnace of the oven 17, flow successively through the sets of conduits 12, 13 and 14 and to the flue 18. The air to be heated is conveyed into the air heater through the conduit 19 by means of a fan (not shown) and flows successively in countercurrent the sets of conduits 14, 13 and 12 whereupon it reaches the chamber 20 where it flows along the walls of the oven 17. The heating of the air is improved by means of baffles 21 which cause the air to follow a zigzag path around each set of conduits.

The wall 22 of the air heater B is provided at an intermediate level between the sets of conduits 14 and 13 with a mouth $23_{a-b}$ (Figs. 1 and 4) connected to the upper collector $4_{a-b}$ through the vertical channel $24_{a-b}$. By this arrangement a portion of the air heated e. g. at a temperature of 30° C. in contact with the upper set of conduits 14 is conveyed to the pair of roof-shaped conduit rows $a$ and $b$, from which it is distributed through the upper layer of the column of malt contained in the tower.

In a similar manner an air intake $25_{e-f}$ is provided between the sets of conduits 13 and 12 and communicates with the collector $4_{e-f}$ for supplying air, heated e. g. in contact with the sets 14 and 13 at a temperature of 60° C., to the pair of rows of roof-shaped conduits $e$—$f$, by which it is distributed to the adjacent layer of malt that has already undergone a preliminary drying at 30° C.

A third air intake $27_{i-l}$ is provided in the upper portion of the chamber of the oven 17; this air intake communicates through the channel $28_{i-l}$ with the collector $4_{i-l}$ and supplies air heated, e. g. at 80° C. to the pair of roof-shaped conduits $i$—$l$. Finally, a fourth air intake situated in the lower portion of the chamber of the oven 17 communicates through the channel $30_{o-p}$ with the collector $4_{o-p}$ and supplies air, heated e. g. at 100° C., to the pair of roof-shaped conduits $o$ and $p$.

The collectors $4_{a-b}$—$4_{e-f}$—$4_{i-l}$—$4_{o-p}$ are provided with valves 31, operable from the outside, for adjusting and limiting the quantity of air heated at the different temperatures in a manner such that the air issues from the drying tower almost saturated.

The valve of the upper collector, which supplies air at lower temperature to the fresh malt, shall be almost entirely open to permit a larger quantity of air to be conveyed to the layer of malt which is in the moistest condition.

The valves of the second and third collector shall be partly open in a degree increasing from the upper portion of the tower to the lower and finally the valve of the fourth collector shall be almost closed, as the current of air here no longer has to remove moisture, its object simply being to maintain the desired elevated temperature so that the malt can acquire the desired flavour before reaching the delivery.

In order to adjust the temperature exactly in the four stages of the drying tower in the channels which connect the various air intakes with the respective collectors I have provided valves 32 operable from the outside which serve for mixing according to requirements currents of less warm air with currents of warmer air, so as to obtain in each malt layer in the tower the best suited temperature.

Figure 6:
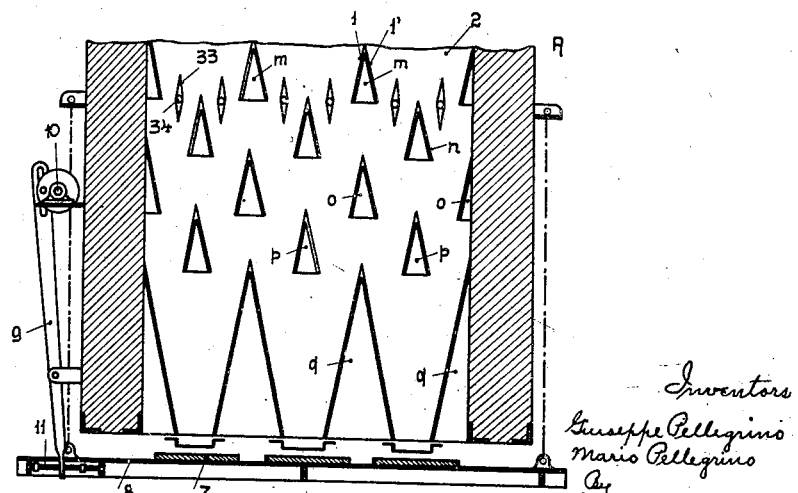
Figure 6 is a vertical section of the lower end of the drying tower showing the device for delivering the dried malt.

In order to ensure a uniform heating of the malt from the beginning of the drying process, the drying tower is provided immediately underneath the roof-shaped conduits delivering air currents at different temperatures with valves 33 of the throttle type (Figures 1 and 6) carried by pins 34 mounted capable of oscillation on suitable supports on the opposite walls of the drying tower A. These throttle valves form in their horizontal position (Fig. 1) a plane of support for the column of malt fed from above and in their vertical position (Fig. 6) they do not hinder in the least the descent of the malt.

The throttle valves 33 are operated from the outside by means of handles or other suitable means, not shown; the open and closed position of the valves is determined by stops provided on suitable guide plates not shown.

The throttle valves 33 situated on the same horizontal plane can be actuated simultaneously or separately.

The working is as follows: Before starting the drying process the upper row of throttle valves 33 is first closed, the malt is introduced into the upper portion of the drying tower and a current of air heated at the lowest temperature, e. g. 30° C. is conveyed to the layer of malt. When the grains have reached the desired dried condition for this first drying stage, the underlying row of throttle valves 33 is closed and the upper row is opened. Consequently, the partly dried column of malt descends on the roof-shaped conduits which deliver the current of air at a higher temperature, e. g. 60° C. and fresh malt is charged at the top. In this manner the first layer, partly dried, is dried further at a higher temperature while the fresh layer of malt is submitted to the first charging operation.

We proceed in a similar manner for the lower row of throttle valves until the column of malt reaches the outlet mouths. In this manner all the malt traversing the drying apparatus is submitted to a uniform treatment and there is no waste due to unequal drying at the start of the operation, as in drying apparatus presently in use.

When the column of malt reaches the slats 7 these latter are set in motion so as to cause the treated malt to be gradually and continuously discharged.

The temperature and the volume of air passing through the various layers of malt are accurately controlled by the adjustment of the valves 31 and 32.

In the drying apparatus according to this invention, the duration of the treatment is of about sixteen hours, therefore considerably shorter than in the drying apparatus presently in use.

The air heater can be of a type other than that shown, e. g. we can employ steam as a source of heat.

A very important advantage of the drying apparatus according to this application is that the preliminary malt drying operation, following germination, is done away with. This preliminary drying is generally effected by spreading the malt, after germination, on a large surface in a thin layer of about 4 to 5 centimeters, this operation being very expensive because it requires a large space and much work.

With the drying apparatus according to this application the preliminary drying can be easily and rapidly effected at as low a temperature as is desired, by conveniently varying the drops in temperature in the drying tower.

What we claim is:

1. Apparatus for drying malt and other grains, comprising a tower adapted to be charged at the top with material to be dried, means at the lower end of the tower for discharging in a continuous manner the dried material, rows of roof-shaped conduits open below arranged horizontally through the tower at equal distances, every other row of said conduits communicating freely with the atmosphere, an air heater and channels connecting different points of said heater with rows of conduits alternate with the rows of roof-shaped conduits communicating with the atmosphere for conveying into said conduits currents of hot air at temperatures gradually increasing from the upper to the lower end of the tower.

2. Apparatus for drying malt and other grains, comprising a tower adapted to be charged at the top with material to be dried, means at the lower end of said tower discharging in a continuous manner the dried material, rows of roof-shaped conduits open below arranged horizontally through the tower at equal distances, the conduits of one row being arranged in staggered relationship to those of the adjacent rows, horizontal collectors arranged at different heights and communicating with alternate rows of said roof-shaped conduits, the other rows of conduits communicating freely with the atmosphere, an air heater and channels establishing communication between said collectors and different points of said air heater in order to supply currents of air at temperatures gradually increasing from the topmost collector to the lowermost collector.

3. Apparatus for drying malt and other grains, comprising a tower adapted to be charged at the top with material to be dried, means at the lower end of said tower for discharging in a continuous manner the dried material, rows of roof-shaped conduits open below arranged horizontally through the tower at equidistant heights, the conduits of one row being arranged in staggered relationship to those of the adjacent rows, horizontal collectors arranged at different heights and communicating with alternate sets of rows of said roof-shaped conduits on one side of said tower, the other sets of rows of conduits communicating freely with the atmosphere on the opposite side of said tower, an oven, superposed rows of heating conduits connected in series through which the combustion products from said oven are conveyed, a heating chamber enclosing said heating conduits and said oven, partitions in said chamber so arranged as to force a current of air to flow along said heating conduits following a zigzag path and channels establishing communication between said collectors and different points of said heating chamber for supplying currents of air at temperatures gradually increasing from the topmost towards the lowermost collector.

4. Apparatus for drying malt and other grains, comprising a tower adapted to be charged at the top with material to be dried, means at the lower end of said tower for continuously discharging the dried material, rows of roof-shaped conduits open below arranged horizontally through the tower at equidistant heights, the conduits of one row being arranged in staggered relationship to those of the adjacent rows, horizontal collectors arranged at different heights and communicating with one end of the roof-shaped conduits of alternate rows of said conduits, the opposite ends of the conduits of the other rows communicating freely with the atmosphere, an air heater, channels connecting said collectors with different points of said air heater for supplying currents of air at temperatures gradually increasing from the upper to the lower end of the tower and valve devices between said channels and said collectors for adjusting the quantity of air supplied to each of said collectors and valve devices between the various connecting channels for simultaneously controlling the temperature in each collector.

5. Apparatus for drying malt and other grains, comprising a tower adapted to be charged at the top with material to be dried, means at the lower end of said tower for discharging in a continuous manner the dried material, rows of roof-shaped conduits open below arranged horizontally through the tower at equidistant heights, the conduits of one row being arranged in staggered relationship to those of the adjacent rows, horizontal collectors arranged at different heights and communicating with alternate sets of rows of said roof-shaped conduits on one side of said tower, the other sets of conduit rows communicating freely with the atmosphere on the opposite side of said tower, an oven, superposed rows of heating conduits connected in series through which the combustion products from said oven are conveyed, a heating chamber enclosing said heating conduits and said oven, partitions in said chamber so placed as to force a current of air to flow along said heating conduits following a zigzag path and said oven on a zigzag path and channels establishing communication between said collectors and different points of said heating chamber for supplying currents of air at temperatures gradually increasing from the topmost to the lowermost collector, valve devices between said connecting channels and said collectors for adjusting the quantity of air supplied to each of said collectors and valve devices between the various connecting channels for adjusting the temperature in each collector.

6. Apparatus for drying malt and other grains, comprising a tower adapted to be charged at the top with material to be dried, rows of roof-shaped conduits open at their lower end arranged horizontally through the tower at equidistant heights; the conduits of one row being in staggered relationship to those of the adjacent rows, collectors arranged horizontally at different heights and communicating with alternate rows of said roof-shaped conduits, the other rows of conduits communicating freely with the atmosphere, an air heater, channels for establishing communication between said collectors and different points of said heater for supplying currents of air of gradually increasing temperatures from the topmost collector to the lowermost collector, traps arranged horizontally through the tower at levels substantially equal to those of said collectors for temporarily holding back the column of grain in the tower at said levels during the starting of the drier and means at the bottom of the tower for discharging the dried material in a uniform and continuous manner.

7. Apparatus for drying malt or other grains, comprising a tower adapted to be charged at the top with material to be dried, rows of roof-shaped conduits open at their lower end, arranged horizontally through the tower at equidistant heights, the conduits of one row being in staggered relationship to those of the adjacent rows, horizontal collectors arranged at different heights and communicating with alternate rows of said roof-shaped conduits, the other rows communicating freely with the atmosphere, an air heater, channels for establishing communication between said collectors and different points of the heater for supplying currents of air at gradually increasing temperatures from the topmost collector to the lowermost collector, rows of throttle valves arranged horizontally at levels substantially those of the collectors in the tower, in such manner that when they are brought into the horizontal plane they form a supporting surface for temporarily holding back the column of grain in the tower at said levels during the starting of the apparatus, and means at the bottom of the tower for discharging the dried material continuously and uniformly.

GIUSEPPE PELLEGRINO.
MARIO PELLEGRINO.